W. T. DONNELLY.
METHOD OF SECURING WOODEN PARTS.
APPLICATION FILED DEC. 6, 1917.
1,273,588.
Patented July 23, 1918.
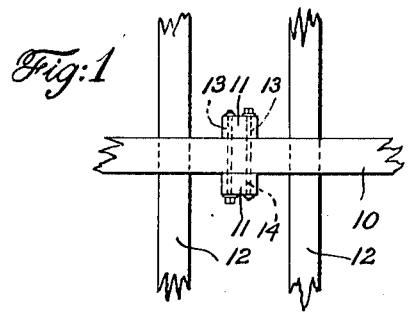
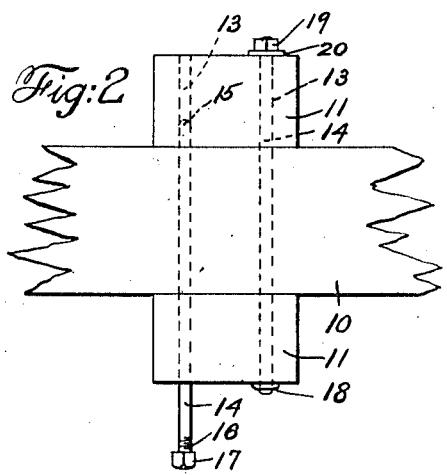
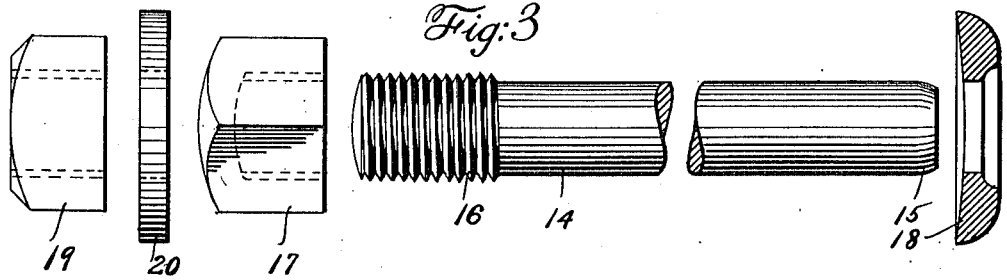
INVENTOR
William T. Donnelly
BY
ATTORNEY

UNITED STATES PATENT OFFICE.

WILLIAM T. DONNELLY, OF BROOKLYN, NEW YORK.

METHOD OF SECURING WOODEN PARTS.

1,273,588.  Specification of Letters Patent.  Patented July 23, 1918.

Application filed December 6, 1917. Serial No. 205,798.

*To all whom it may concern:*

Be it known that I, WILLIAM T. DONNELLY, a citizen of the United States, and a resident of Brooklyn, in the county of Kings and State of New York, have invented certain new and useful Improvements in Methods of Securing Wooden Parts, of which the following is a specification.

The invention relates to a method of securing wooden parts to one another by means of a screw-bolt; and it has for its object to effect same in a simple and expeditious manner, and to enable the members to be subsequently drawn up tight should this for any reason become necessary.

The method will be found particularly applicable to marine work, as it has been found impossible heretofore to employ screw bolts with large timbers, as utilized in ship construction. In attempting to drive with the threaded end of a bolt through a smaller hole, the result has been to cut or ream out the same through the action of the threads of the bolt. Moreover, if the threads were made of smaller diameter than the body of the bolt, this would result only in a waste of material and weakening of the threaded portion. In consequence, few, if any, screw bolts are used in the building of wooden ships, drift bolts and wooden pins being almost exclusively employed for this purpose and the parts rack and yield as the wood seasons and shrinks. By the method herein proposed, not only may the standard diameter of the bolt body and thread portion be maintained, but an absolutely tight fit is insured, and a means provided, furthermore, for maintaining the rigidity and strength as the wood seasons and shrinks.

The nature of the invention will be best understood when described in connection with the accompanying drawings, in which—

Figure 1 illustrates the invention as applied, for example, to the construction of a bulkhead.

Fig. 2 is a detail view of a connection.

Fig. 3 is a detail view of the bolt and parts employed therewith.

Similar characters of reference designate corresponding parts throughout the several views.

Referring to the drawings, the invention, as exemplified in the embodiment herein disclosed, namely, the method of uniting stiffeners with a bulkhead, consists essentially in boring a hole of the proper diameter through the parts to be united, then forcing through same the unthreaded portion of a bolt, first placing over the threaded end of the latter a cap nut. A clench ring is then secured to the free end of the bolt and the cap nut replaced with a nut of the usual type, whereupon the nut is set up to secure the members.

Referring more particularly to Figs. 1 and 2 of the drawings, 10 designates a bulkhead and 11 stiffener members located on opposite sides thereof and at certain intervals between deck beams 12, and which it is desired to secure to the bulkhead. In accordance with the present invention, suitable holes 13 are bored through the stiffener members 11 and the bulkhead 10, which holes are made of slightly less diameter than the smooth portion 14 of the bolt, which is designed to be forced therethrough, as is hereinafter set forth. The bolt is shown in detail in Fig. 3, the smooth or unthreaded portion 14 thereof terminating at one end in a portion 15 of slightly reduced diameter, and at the other end in threads 16, and which portion is preferably upset, that is to say, the threads are larger in diameter than the smooth portion 14 of the bolt. In driving the bolt, the end 15 is inserted, and a cap nut 17 secured over the threaded end 16 to protect the said threads. The bolt is then driven through the parts 10 and 11 until its end 15 emerges, whereupon a clench ring 18 is placed thereover and riveted thereto in well-known manner. This forms the head of the bolt; and, thereupon, the cap nut 17 is removed from the end 16 and a nut 19 of the usual type substituted therefor, a washer 20 being first interposed. Nut 19 may then be set up to securely lock the members together, and in case of any seasoning or shrinkage of the wood, the said nut may be tightened on the bolt. This is of particular advantage in constructions wherein but one end of the bolt is subsequently accessible, for, in such instances, it would be impossible to rivet an end of the bolt after the same has been located and as the result of construction.

I claim:

1. The method of securing wooden parts by means of drive screw bolts, unthreaded over the portion designed to pass through said parts, which consists in boring through said parts a hole of slightly less diameter than said bolt, placing a cap nut over the threaded end thereof and driving said bolt
5 through until the head end thereof emerges, forming a head on the bolt, removing said cap nut and replacing same with a nut of the usual type, and setting up said nut to secure the members.

10   2. The method of securing wooden parts by means of drive screw bolts, unthreaded over the portion designed to pass through said parts, which consists in boring through said parts a hole of slightly less diameter than said bolt, placing a cap nut over the threaded end thereof and driving said bolt through until the head end thereof emerges, securing a clench ring thereto to form the head of the bolt, removing said cap nut and replacing same with a nut of the usual type, and setting up said nut to secure the members.

Signed at New York, in the county of New York and State of New York this 1st day of December, A. D. 1917.

WILLIAM T. DONNELLY.